US008234860B2

(12) United States Patent
Beschorner et al.

(10) Patent No.: US 8,234,860 B2
(45) Date of Patent: Aug. 7, 2012

(54) MACHINE CONTROL SYSTEM HAVING HYDRAULIC WARMUP PROCEDURE

(75) Inventors: Matthew J. Beschorner, Plainfield, IL (US); Jason J. Podany, Washington, IL (US); Aleksandar M. Egelja, Naperville, IL (US); Mikhail A. Sorokine, Naperville, IL (US); Benjamin Yoo, Itasca, IL (US); Manu Murthy, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 1007 days.

(21) Appl. No.: 12/230,461

(22) Filed: Aug. 29, 2008

(65) Prior Publication Data

US 2010/0050621 A1 Mar. 4, 2010

(51) Int. Cl.
*F16D 31/02* (2006.01)

(52) U.S. Cl. ............................... 60/329; 60/431; 60/445

(58) Field of Classification Search .................... 60/329, 60/431, 445

See application file for complete search history.

(56) References Cited

U.S. PATENT DOCUMENTS 4,129,986 A 12/1978 Heinrich
4,211,256 A 7/1980 Sturtz, Jr.
4,226,270 A 10/1980 Sturtz, Jr. et al.
4,373,869 A * 2/1983 Martin et al. .................. 60/329
4,951,466 A 8/1990 Macht
4,972,762 A 11/1990 Kubik
5,251,440 A 10/1993 Bong-dong et al.
5,410,878 A 5/1995 Lee et al.
5,456,078 A 10/1995 Goloff
5,990,800 A 11/1999 Tamaki et al.
6,397,590 B1 6/2002 Hart
6,453,668 B1 9/2002 Johnson
6,655,135 B2 12/2003 Oka
6,672,285 B2 1/2004 Smith et al.

(Continued)

FOREIGN PATENT DOCUMENTS

EP 1591648 11/2005

(Continued)

OTHER PUBLICATIONS

Kobelco "ED195 Blade Runner," Kobelco Construction Machinery America LLC (16 pages) http://www.kobelcoamerica.com/products/bladerunner/Documents/ED195_EZprint.pdf, 2008.

(Continued)

*Primary Examiner* — Daniel Lopez
(74) *Attorney, Agent, or Firm* — Finnegan, Henderson, Farabow, Garrett & Dunner LLP

(57) ABSTRACT

A control system for a machine is disclosed. The control system may have a pump, a low pressure reservoir, and at least one actuator connected to receive fluid pressurized by the pump and discharge fluid to the low pressure reservoir. The control system may also have a bypass passage situated to allow fluid to bypass the at least one actuator, and a warmup valve disposed within the bypass passage and being movable between a flow-passing position and a flow-blocking position. The control system may further have a hydraulic temperature sensor configured to generate a signal indicative of a temperature of the fluid, and a controller in communication with the pump, the warmup valve, and the hydraulic temperature sensor. The controller may be configured to move the warmup valve to the flow-passing position, fix a displacement position of the pump, and adjust an input speed of the pump in response to the signal.

16 Claims, 3 Drawing Sheets

U.S. PATENT DOCUMENTS

| | | | |
|---|---|---|---|
| 2006/0021340 | A1 | 2/2006 | Vigholm et al. |
| 2006/0191732 | A1 | 8/2006 | Lunzman et al. |

FOREIGN PATENT DOCUMENTS

| | | |
|---|---|---|
| EP | 1707691 | 10/2006 |
| JP | 05202911 | 8/1993 |
| JP | 10008491 | 1/1998 |

OTHER PUBLICATIONS

Kobelco "2155R ACERA, 235SR ACERA Short Radius Excavators," Kobelco Construction Machinery America LLC (20 pages) http://www.kobelcoamerica.com/products/shortradius/Documents/tbi_s51IVDGalleryItems_Document397_66_215SR_235SR%20EasyPrint.pdf, 2008.

Kobelco "SK850LC Super Acera Tier III Excavator," Kobelco Construction Machinery America LLC (20 pages) http://www.kobelcoamerica.com/products/fullsize/Documents/tbl_s51IVDGalleryltems_Document397_132_SK850LC%20Super%20Acera%20Tier%20III_BR_082509.pdf, 2008.

* cited by examiner

MACHINE CONTROL SYSTEM HAVING HYDRAULIC WARMUP PROCEDURE

TECHNICAL FIELD

The present disclosure relates generally to a machine control system, and more particularly, to a machine control system having a hydraulic warmup procedure.

BACKGROUND

Hydraulic machines such as, for example, dozers, loaders, excavators, motor graders, and other types of heavy equipment use one or more hydraulic actuators to accomplish a variety of tasks. These actuators are fluidly connected to a pump on the machine that provides pressurized fluid to chambers within the actuators. As the pressurized fluid moves into or through the chambers, the pressure of the fluid acts on hydraulic surfaces of the chambers to affect movement of the actuator and a connected work tool. When the pressurized fluid is drained from the chambers it is returned to a low pressure sump on the machine.

One problem associated with this type of hydraulic arrangement involves starting or operation of the machine when temperatures are low. Specifically, if the fluid used to move the actuators and/or associated valves is too cold, operation of the machine can become unpredictable and sluggish. In addition, cold operation or improper warming of the machine's components could result in damage to the machine. Thus, a warmup procedure may be useful prior to operation of the machine and the work tool.

One such warmup procedure is described in U.S. Pat. No. 5,410,878 (the '878 patent) issued to Lee et al. on May 2, 1995. Specifically, the '878 patent describes a hydraulic system equipped with an engine and a hydraulic pump driven by the engine and controlled by a microcomputer. The hydraulic system also includes a hydraulic actuator operated by pressurized oil discharged from the hydraulic pump, a valve disposed between the hydraulic pump and the hydraulic actuator, a first temperature sensor configured to detect a temperature of a lubricant oil within the engine, a second temperature sensor configured to detect a temperature of a cooling water within the engine, and a third temperature sensor configured to detect a temperature of the oil pressurized by the hydraulic pump.

During operation of the hydraulic system of the '878 patent, the microcomputer monitors the temperatures of the lubricant oil, the cooling water, and the pressurized oil to determine if warmup is necessary. When warmup is necessary, the microcomputer increases a rotational speed of the engine to a predetermined rotational speed, and then slowly adjusts a discharge oil amount and a pressure of the hydraulic pump and the valve until a load on the engine reaches a predetermined amount. The microcomputer continues to monitor the lubricant oil, cooling water, and pressurized oil temperatures and, after these temperatures reach predetermined values, operation of the engine, the pump, and the valve is returned to a low-idling operation.

Although the hydraulic system and method disclosed within the '878 patent may be helpful in warming a hydraulic system, the benefit thereof may be minimal. Specifically, although the fluid within the hydraulic system may be sufficiently warmed, the associated valves may remain too cold for proper operator or be heated at a rate that results in sticking or damage of the valves.

The disclosed machine control system is directed to overcoming one or more of the problems set forth above and/or other problems of the prior art.

SUMMARY OF THE INVENTION

One aspect of the present disclosure is directed to a machine control system. The machine control system may include a pump driven to pressurize fluid, a low pressure reservoir, and at least one actuator connected to receive fluid pressurized by the pump and to discharge fluid to the low pressure reservoir. The machine control system may also include a bypass passage situated to allow fluid pressurized by the pump to bypass the at least one actuator and flow to the low pressure reservoir, and a warmup valve disposed within the bypass passage and being movable between a flow-passing position and a flow-blocking position. The machine control system may further include a hydraulic temperature sensor configured to generate a signal indicative of a temperature of the fluid, and a controller in communication with the pump, the warmup valve, and the hydraulic temperature sensor. The controller may be configured to move the warmup valve to the flow-passing position, fix a displacement position of the pump, and adjust an input speed of the pump in response to the signal.

Another aspect of the present disclosure is directed to a method of warming a machine control system. The method may include displacing an amount of fluid at a displacement rate to pressurize the fluid, and directing pressurized fluid to an actuator. The method may further include sensing a temperature of the fluid and, in response to the sensed temperature, selectively directing pressurized fluid to bypass the actuator, fixing the displacement amount, and adjusting the displacement rate.

DETAILED DESCRIPTION

Figure 1:
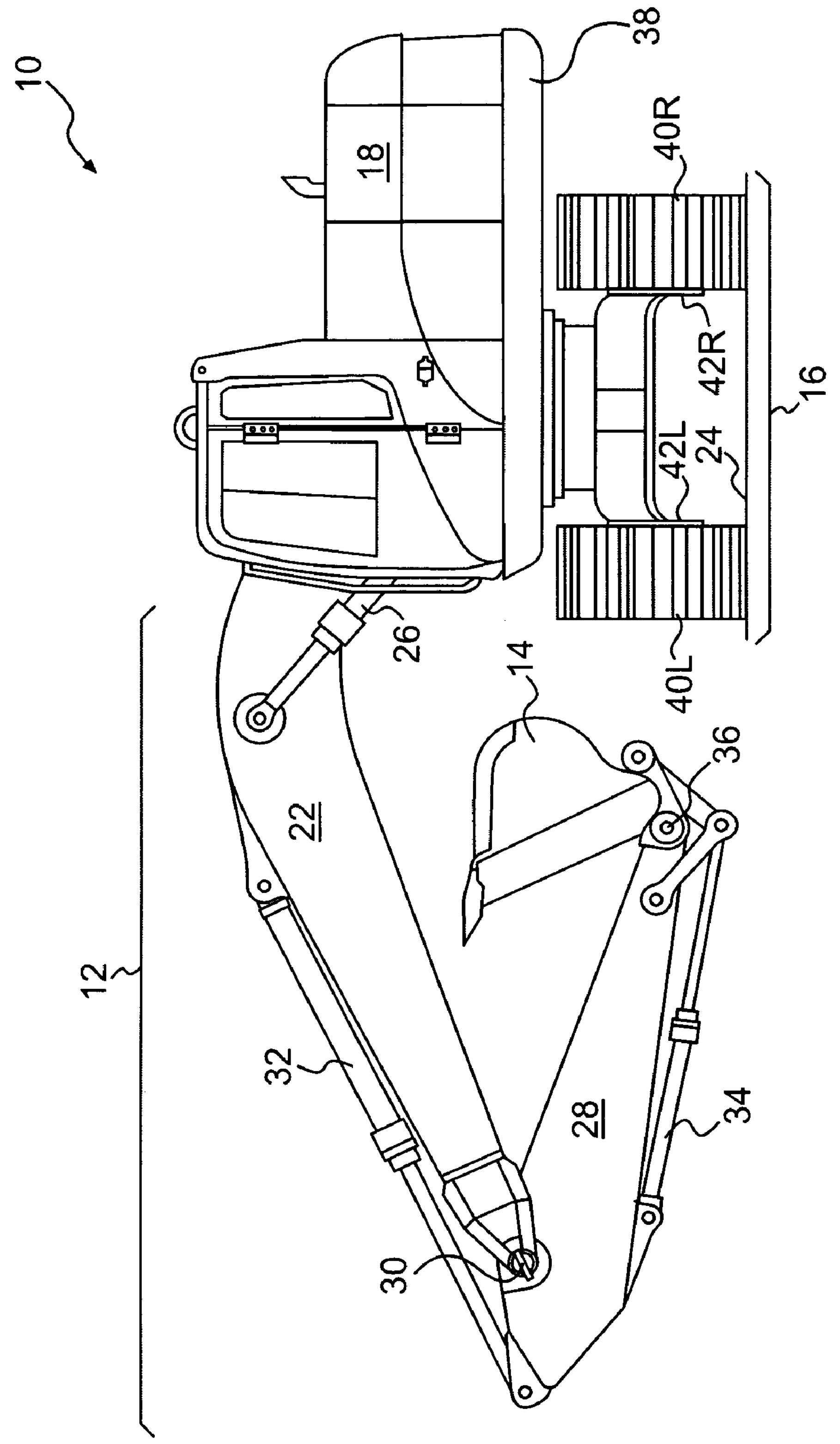
FIG. 1 is a side-view diagrammatic illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or any other industry known in the art. For example, machine 10 may be an earth moving machine such as an excavator, a dozer, a loader, a backhoe, a motor grader, a dump truck, or any other earth moving machine. Machine 10 may include an implement system 12 configured to move a work tool 14, a drive system 16 for propelling machine 10, and a power source 18 that provides power to implement and drive systems 12, 16.

Implement system 12 may include a linkage structure acted on by fluid actuators to move work tool 14. Specifically, implement system 12 may include a boom member 22 vertically pivotal about a horizontal axis (not shown) relative to a work surface 24 by a pair of adjacent, double-acting, hydraulic cylinders 26 (only one shown in FIG. 1). Implement system 12 may also include a stick member 28 vertically pivotal about a horizontal axis 30 by a single, double-acting, hydraulic cylinder 32. Implement system 12 may further include a single, double-acting, hydraulic cylinder 34 operatively connected to work tool 14 to pivot work tool 14 vertically about a horizontal pivot axis 36. Boom member 22 may be pivotally connected to a frame 38 of machine 10. Stick member 28 may pivotally connect boom member 22 to work tool 14 by way of horizontal and pivot axis 30 and 36.

Each of hydraulic cylinders 26, 32, 34 may include a tube and a piston assembly (not shown) arranged to form two separated pressure chambers. The pressure chambers may be selectively supplied with pressurized fluid and drained of the pressurized fluid to cause the piston assembly to displace within the tube, thereby changing an effective length of hydraulic cylinders 26, 32, 34. The flow rate of fluid into and out of the pressure chambers may relate to a velocity of hydraulic cylinders 26, 32, 34, while a pressure differential between the two pressure chambers may relate to a force imparted by hydraulic cylinders 26, 32, 34 on the associated linkage members. The expansion and retraction of hydraulic cylinders 26, 32, 34 may function to assist in moving work tool 14.

Numerous different work tools 14 may be attachable to a single machine 10 and controllable by an operator of machine 10. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot relative to machine 10, work tool 14 may alternatively or additionally rotate, slide, swing, lift, or move in any other known manner.

Drive system 16 may include one or more traction devices used to propel machine 10. In one example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices, if desired.

Each of left and right travel motors 42L, 42R may be driven by creating a fluid pressure differential. Specifically, each of left and right travel motors 42L, 42R may include first and second chambers (not shown) located to either side of an impeller (not shown). When the first chamber is filled with pressurized fluid and the second chamber is drained of fluid, the impeller may be urged to rotate in a first direction. Conversely, when the first chamber is drained of the fluid and the second chamber is filled with the pressurized fluid, the respective impeller may be urged to rotate in a second direction opposite the first direction. The flow rate of fluid into and out of the first and second chambers may relate to a rotational velocity of left and right travel motors 42L, 42R, while a pressure differential between left and right travel motors 42L, 42R may relate to a torque.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left and right travel motors 42L, 42R.

Figure 2:
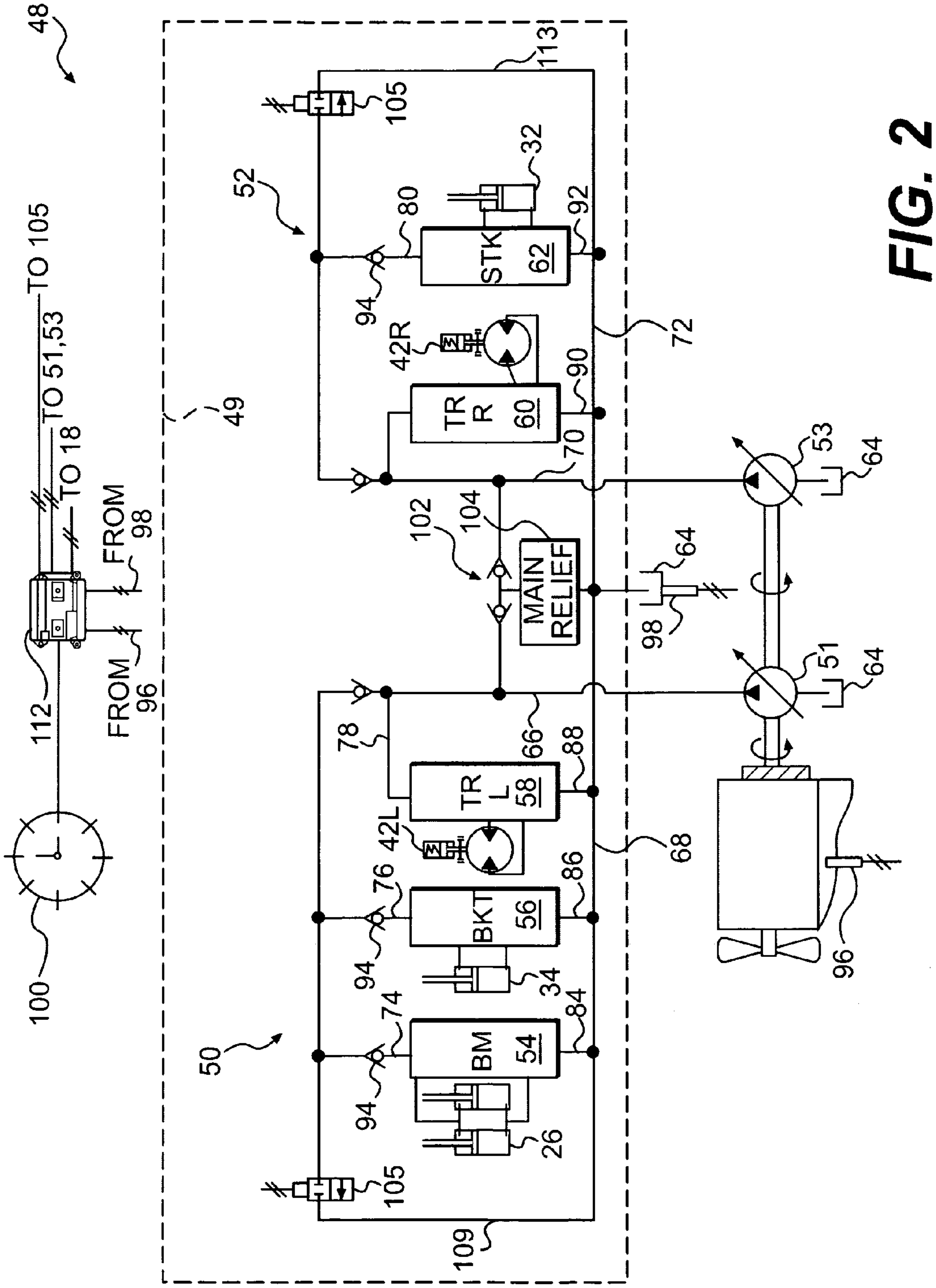
FIG. 2 is a schematic illustration of an exemplary disclosed machine control system that may be used with the machine of FIG. 1.

As illustrated in FIG. 2, machine 10 may include a machine control system 48 having a plurality of fluid components that cooperate to move work tool 14 (referring to FIG. 1) and machine 10. In particular, machine control system 48 may include valve stack 49 at least partially forming a first circuit 50 configured to receive a first stream of pressurized fluid from a first source 51, and a second circuit 52 configured to receive a second stream of pressurized fluid from a second source 53. First circuit 50 may include a boom control valve 54, a bucket control valve 56, and a left travel control valve 58 connected to receive the first stream of pressurized fluid in parallel. Second circuit 52 may include a right travel control valve 60 and a stick control valve 62 connected to receive the second stream of pressurized fluid in parallel. It is contemplated that a greater number, a lesser number, or a different configuration of valve mechanisms may be included within first and/or second circuits 50, 52, if desired. For example, a swing control valve (not shown) configured to control a swinging motion of implement system 12 relative to drive system 16, one or more attachment control valves (not shown), and other suitable control valve mechanisms may be included.

First and second sources 51, 53 may draw fluid from one or more tanks 64 and pressurize the fluid to predetermined levels. Specifically, each of first and second sources 51, 53 may embody a pumping mechanism such as, for example, a variable displacement pump. First and second sources 51, 53 may each be separately and drivably connected to an output rotation power source 18 of machine 10 by, for example, a countershaft (not shown), a belt (not shown), an electrical circuit (not shown), or in any other suitable manner. Alternatively, each of first and second sources 51, 53 may be indirectly connected to power source 18 via a torque converter, a reduction gear box, or in another suitable manner. In this manner, for a fixed displacement amount, an input speed of first and second sources 51, 53 (i.e., an output speed of power source 18) may be controllably varied to adjust a displacement rate (i.e., a discharge flow rate) of first and second sources 51, 53. And, for a given input speed, the displacement amounts of first and second sources 51, 53 may be independently varied to adjust their respective displacement rates. Thus, the first and second streams of pressurized fluids may be produced by first and second sources 51, 53, respectively, to have different pressure levels and/or flow rates. It is contemplated that only a single source may alternatively provide pressurized fluid to both first and second circuits 50, 52, if desired.

Tank 64 may constitute a low-pressure reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 64. It is contemplated that machine control system 48 may be connected to multiple separate fluid tanks or to a single tank.

Each of boom, bucket, left travel, right travel, and stick control valves 54-62 may regulate the motion of their associated fluid actuators. Specifically, boom control valve 54 may have elements movable to control the motion of hydraulic cylinders 26 associated with boom member 22, bucket control valve 56 may have elements movable to control the motion of hydraulic cylinder 34 associated with work tool 14, and stick control valve 62 may have elements movable to control the motion of hydraulic cylinder 32 associated with stick member 28. Likewise, left travel control valve 58 may have valve elements movable to control the motion of left travel motor 42L, while right travel control valve 60 may have elements movable to control the motion of right travel motor 42R.

The control valves of first and second circuits 50, 52 may be connected to regulate flows of pressurized fluid to and from their respective actuators via common passages. Specifically, the control valves of first circuit 50 may be connected to first source 51 by way of a first common supply passage 66 that extends along one side of valve stack 49, and to tank 64 by way of a first common drain passage 68 extending along a side of valve stack 49 opposite first common supply passage 66. Similarly, the control valves of second circuit 52 may be connected to second source 53 by way of a second common supply passage 70 that extends along one side of valve stack 49, and to tank 64 by way of a second common drain passage 72 that extends along a side of valve stack 49 opposite second common supply passage 70. Boom, bucket, and left travel control valves 54-58 may be connected in parallel to first common supply passage 66 by way of individual fluid passages 74, 76, and 78, respectively, and in parallel to first common drain passage 68 by way of individual fluid passages 84, 86, and 88, respectively. Similarly, right travel and stick control valves 60, 62 may be connected in parallel to second common supply passage 70 by way of individual fluid passages 82 and 80, respectively, and in parallel to second common drain passage 72 by way of individual fluid passages 90 and 92, respectively. A check valve 94 may be disposed within each of fluid passages 74, 76, and 80 to provide for a unidirectional supply of pressurized fluid to control valves 54, 56, and 62, respectively.

Because the elements of boom, bucket, left travel, right travel, and stick control valves 54-62 may be similar and function in a related manner, only the operation of boom control valve 54 will be discussed in this disclosure. In one example, boom control valve 54 may include a first chamber supply element (not shown), a first chamber drain element (not shown), a second chamber supply element (not shown), and a second chamber drain element (not shown). The first and second chamber supply elements may be connected in parallel with fluid passage 74 to fill their respective chambers with fluid from first source 51, while the first and second chamber drain elements may be connected in parallel with fluid passage 84 to drain the respective chambers of fluid. To extend hydraulic cylinders 26, the first chamber supply element may be moved to allow the pressurized fluid from first source 51 to fill the first chambers of hydraulic cylinders 26 with pressurized fluid via fluid passage 74, while the second chamber drain element may be moved to drain fluid from the second chambers of hydraulic cylinders 26 to tank 64 via fluid passage 84. To move hydraulic cylinders 26 in the opposite direction, the second chamber supply element may be moved to fill the second chambers of hydraulic cylinders 26 with pressurized fluid, while the first chamber drain element may be moved to drain fluid from the first chambers of hydraulic cylinders 26. It is contemplated that both the supply and drain functions may alternatively be performed by a single element associated with the first chamber and a single element associated with the second chamber, or by a single valve that controls all filling and draining functions.

The common supply and drain passages 66-72 of first and second circuits 50, 52 may be interconnected for relief functions. In particular, first and second common drain passages 68, 72 may relieve fluid from first and second circuits 50, 52 to tank 64 during normal operation. However, as fluid within first or second circuits 50, 52 exceeds a maximum acceptable pressure level, fluid from the circuit having the excessive pressure may also drain to tank 64 by way of supply passages 66, 70, a shuttle valve 102, and a common main relief element 104. It is contemplated that common supply passages 66, 70 of first and second circuits 50, 52 may similarly be interconnected for makeup functions, if desired.

Machine control system 48 may also include a warm-up circuit for use during startup and cold operations of machine 10. That is, common supply and drain passages 66, 68 and 70, 72 of first and second circuits 50, 52, respectively, may be selectively communicated via first and second bypass passages 109, 113 for warm-up and/or other bypass functions. A warmup valve 105 may be located in each of bypass passages 109, 113 and configured to direct fluid from common supply passages 66 and 70 to bypass control valves 54-62 and flow to tank 64 by way of common drain passages 68 and 72. Each warmup valve 105 may include a valve element movable from a closed or flow-blocking position to an open or flow-passing position. In this configuration, when warmup valve 105 is in the open position, such as during start up of machine 10, fluid pressurized by first and second sources 51, 53 may be allowed to circulate through first and second circuits 50, 52 without passing through control valves 54-62. Warmup valves 105 may be configured to provide a restriction on the flow of fluid passing therethrough to warm the fluid. In some embodiments, the restriction provided by warmup valves 105 may be variable. After the fluid has been sufficiently warmed, the valve elements of warmup valves 105 may be moved to the closed positions so that the pressure of the fluid within first and second circuits 50, 52 may build and be available for use by control valves 54-62, as described above.

Machine control system 48 may further include a controller 112 configured to regulate operations of machine 10 during startup and cold conditions based on sensed parameters of power source 18 and machine control system 48. Controller 112 may be in communication with power source 18, first source 51, second source 53, and warmup valves 105. Controller 112 may also be in communication with an engine temperature sensor 96, a hydraulic temperature sensor 98, and a timer 100. Based on signals provided by engine and hydraulic temperature sensors 96, 98 and timer 100, controller 112 may affect an output of power source 18, a displacement of first and/or second sources 51, 53, and a position of warmup valves 105 to implement a warmup procedure.

Controller 112 may embody a single microprocessor or multiple microprocessors that include a means for controlling an operation of machine control system 48. Numerous commercially available microprocessors can be configured to perform the functions of controller 112. It should be appreciated that controller 112 could readily be embodied in a general machine microprocessor capable of controlling numerous machine functions. Controller 112 may include a memory, a secondary storage device, a processor, and any other components for running an application. Various other circuits may be associated with controller 112 such as power supply circuitry, signal conditioning circuitry, solenoid driver circuitry, and other types of circuitry.

Engine temperature sensor 96 may embody any type of sensor configured to monitor a temperature of power source 18. In one example, engine temperature sensors 96 may be a fluid sensor associated with a flow of air or exhaust, a coolant, or a lubricant of power source 18. As such, engine temperature sensor 96 may generate a signal indicative of the temperature of power source 18, and direct this signal to controller 112. When the engine temperature signal indicates a temperature lower than a threshold value, for example about 25° C., machine 10 may be considered to be operating in a cold condition.

Hydraulic temperature sensor 98 may embody any type of sensor configured to monitor a temperature of machine control system 48. In one example, hydraulic temperature sensors 98 may be a fluid sensor associated with the fluid of first and/or second circuits 50, 52. As such, hydraulic temperature sensor 98 may generate a signal indicative of the temperature of machine control system 48, and direct this signal to controller 112. When the hydraulic temperature signal indicates a temperature lower than a threshold value, for example about 30° C., machine control system 48 may be considered to be operating in a cold condition.

Timer 100 may be separate from or form a part of controller 112. In response to a command from controller 112, timer 100 may track an elapsed time. Signals indicative of this elapsed time may be directed from timer 100 to controller 112.

Figure 3:
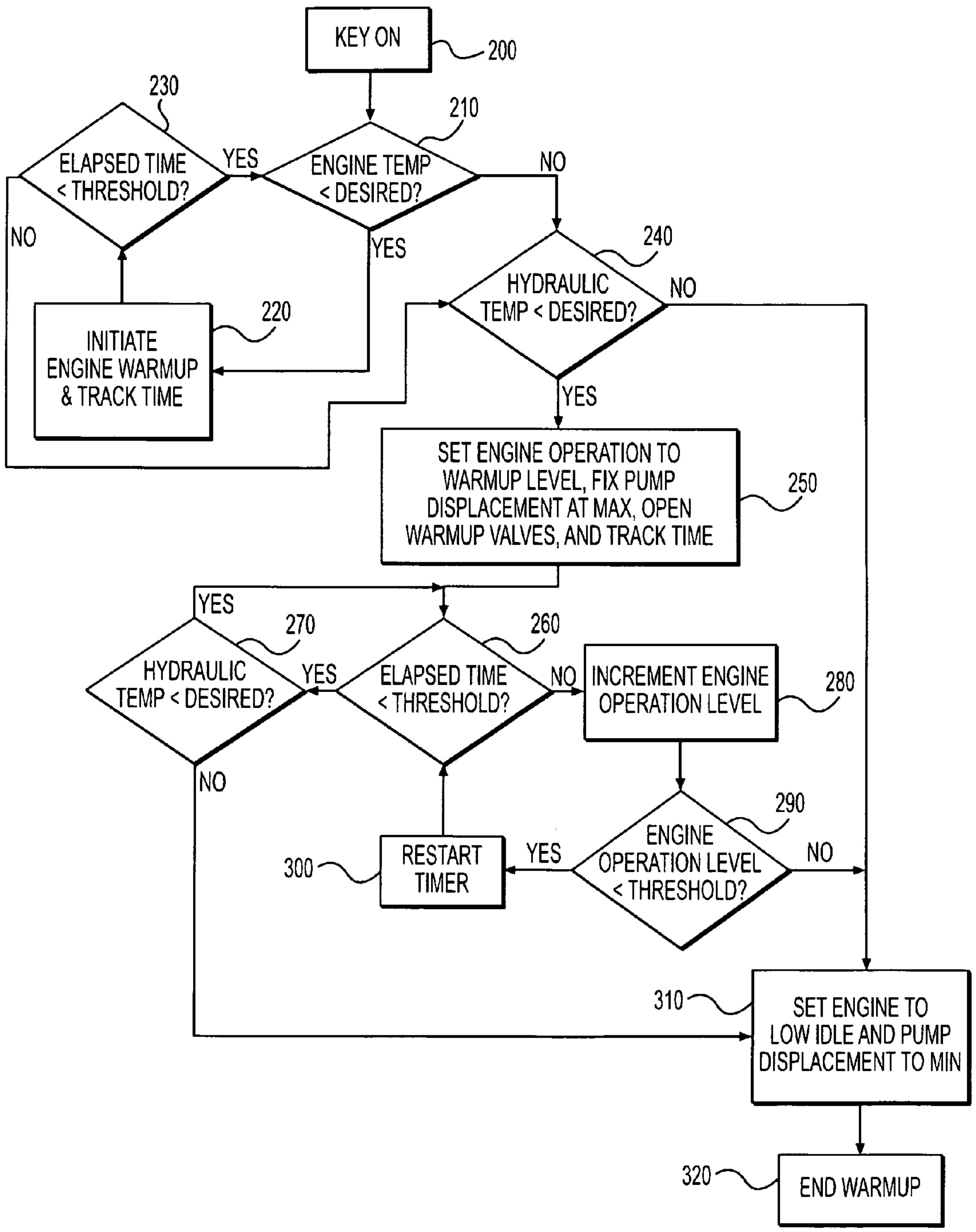
FIG. 3 is a flow chart illustrating an exemplary disclosed method for warming the machine control system of FIG. 2.

FIG. 3 illustrates an exemplary method for warming machine control system 48 during startup or cold operation. FIG. 3 will be discussed in the following section to further illustrate the disclosed system and its operation.

INDUSTRIAL APPLICABILITY

The disclosed machine control system may be applicable to any machine that includes multiple fluid actuators where operation during startup or cold conditions can be damaging or result in undesired performance. The disclosed machine control system may provide a warmup procedure that helps minimize damage and improves performance of the machine. Operation of machine control system 48 will now be explained.

As shown in FIG. 3, a machine operator may initiate startup of machine 10 to begin the warmup procedure discussed above. For example, the operator may turn a key (not shown) or activate another starting control device to an on-position to begin the procedure (Step 200). Once the key has been turned to the on-position and power source 18 has been started, controller 112 may monitor a signal from engine temperature sensor 96 to determine if the indicated engine temperature is suitable for full machine operation (i.e., to determine if the engine temperature is about equal to a desired engine temperature, for example 25° C. or higher) (Step 210). If the engine temperature is too low, an engine warmup strategy may be initiated and timer 100 may be caused to start tracking time (Step 220). In one embodiment, there may be a delay of, for example, about 30-60 seconds after engine startup before the warmup procedure may begin.

During the engine warmup procedure, controller 112 may monitor and compare the tracked time to a threshold time period, for example about five minutes, to determine if power source 18 has been operating in a warming mode for a sufficient amount of time (Step 230). If the tracked time is less than the threshold time period, control may return to step 210 and cycle through steps 210-230 until either the operational time of power source 18 exceeds the threshold time period for warming or the temperature of power source 18 increases to the desired engine temperature. When either of these conditions is met, controller 112 may then monitor a signal from hydraulic temperature sensor 98 to determine if the indicated hydraulic temperature is suitable for full operation of work tool 14 (i.e., to determine if the indicated hydraulic temperature is greater than a desired hydraulic temperature of about 30° C.) (Step 240).

If, at step 240, the temperature indicated by the signal from hydraulic temperature sensor 98 is less than the desired hydraulic temperature, warmup of machine control system 48 may commence. It is contemplated that warmup of machine control system 48 may be delayed by, for example, about 30-60 seconds after engine warmup, if desired. Controller 112 may initiate warmup of machine control system 48 by setting operation of power source 18 to a warmup start level that is greater than a low-idle level, by fixing the displacement of first and/or second sources 51, 53 at a maximum displacement position, by moving one or both of warmup valves 105 to the flow-passing position to cause fluid pressurized by first and/or second sources 51, 53 to bypass control valves 54-62 and their associated actuators, and by causing timer 100 to start tracking time (Step 250). Controller 112 may then monitor the time elapsed since the operational level of power source 18 was adjusted, and compare that time to a level threshold time period (Step 260).

If, at step 260, the comparison reveals that the time elapsed since the operational level of power source 18 was adjusted is less than the level threshold time period, controller 112 may check to see if the hydraulic temperature of machine control system 48 is still less than the desired hydraulic temperature (Step 270). Controller 112 may continue to cycle through steps 260 and 270 until either the time elapsed since the operational level of power source 18 was adjusted becomes equal to or greater than the level threshold period or until the hydraulic temperature becomes equal to or greater than the desired hydraulic temperature.

If, at step 260, the time elapsed since the operational level of power source 18 becomes equal to or greater than the level threshold time period, controller 112 may increment the operational level of power source 18 (Step 280). In one example, the increment may be associated with a rotational speed of power source 18 and have a magnitude equal to about 50-150 rpm, and more specifically about 100 rpm. Controller 112 may compare the current operational level of power source 18 to a maximum allowable or threshold operational level (Step 290). In one example, the maximum allowable or threshold operational level may be about 400-500 rpm higher than the warmup start level. If the comparison of step 290 reveals that the current operational level is less than the threshold operational level, timer 100 may be restarted (Step 300), and control may return to step 260. However, if the comparison of step 290 reveals that the current operational level is about equal to or greater than the threshold operational level, the warmup procedure may be complete.

When the warmup procedure is complete, operation of power source 18 may be returned to a low-idle level, the displacement of first and second sources 51, 53 may be returned to a minimum displacement setting, and one or both of warmup valves 105 may be moved to the flow-blocking positions (Step 310). After completion of step 310, the warmup procedure may be terminated (step 320).

Returning back to step 270, if the temperature indicated by the signal from hydraulic temperature sensor 98 is about equal to or greater than the desired hydraulic temperature (i.e., if the indicated temperature is not less the desired temperature), control may advance to step 310. In this situation, the warmup procedure may be complete regardless of the operational level attained by power source 18.

Several benefits may be associated with the hardware and warming procedure of machine 10. Specifically, because of the arrangement of common supply and drain passages 66-72 within valve stack 49, when the fluid therein is warmed and caused to circulate through valve stack 49, the entire valve stack 49, including control valves 54-62, may be warmed. Further, the disclosed warming procedure may help ensure that the components of machine 10 are warmed in a sequence and at a rate that minimize damage to machine 10 and quickly readies machine 10 for operation.

It will be apparent to those skilled in the art that various modifications and variations can be made to the disclosed machine control system. Other embodiments will be apparent to those skilled in the art from consideration of the specification and practice of the disclosed machine control system. For example, it is contemplated that the above warming procedure may additionally or alternatively commence at any time during operation of machine 10 based on temperatures of power source 18 and or machine control system 18, regardless of operator input (i.e., the warming procedure may be triggered in ways other than by the operator turning the key on). And, it is contemplated that an operator input may override the warming procedure such that full operation of machine 10 may be utilized regardless of the temperatures of power source 18 and machine control system 48, if desired. It is intended that the specification and examples be considered as exemplary only, with a true scope being indicated by the following claims and their equivalents.

What is claimed is:

1. A machine control system, comprising:

a pump driven to pressurize fluid, the pump being driven by an engine to pressurize the fluid;

a low pressure reservoir;

at least one actuator connected to receive fluid pressurized by the pump and discharge fluid to the low pressure reservoir;

a bypass passage situated to allow fluid pressurized by the pump to bypass the at least one actuator and flow to the low pressure reservoir;

a warmup valve disposed within the bypass passage and being movable between a flow-passing position and a flow-blocking position;

a hydraulic temperature sensor configured to generate a signal indicative of a temperature of the fluid; and a controller in communication with the pump, the warmup valve, and the hydraulic temperature sensor, the controller being configured to move the warmup valve to the flow-passing position, fix a displacement position of the pump, and adjust an input speed of the pump in response to the signal only after a temperature of the engine has increased to a desired engine temperature or the engine has driven the pump for a period of time.

2. The machine control system of claim 1, wherein the warmup valve provides a restriction on the fluid passing through the warmup valve to warm the fluid.

3. The machine control system of claim 1, wherein the controller is configured to fix the displacement of the pump at a maximum displacement position when the signal indicates a temperature of the fluid less than a desired temperature.

4. The machine control system of claim 3, wherein the desired temperature is about 30° C.

5. The machine control system of claim 3, wherein the controller is configured to set the input speed of the pump to a speed greater than a low-idle speed when the signal indicates the temperature of the fluid less than the desired temperature.

6. The machine control system of claim 1, wherein the desired engine temperature is about equal to 25° C., and the period of time is about equal to five minutes.

7. The machine control system of claim 1, wherein the at least one actuator includes a plurality of actuators and the machine control system further includes:

a valve stack;

a plurality of control valves disposed within the valve stack and configured to selectively regulate fluid flow to and from the plurality of actuators;

a supply passage extending from the pump through the valve stack to communicate with each of the plurality of control valves in parallel; and a drain passage extending through the valve stack to the low pressure reservoir and fluidly communicating with each of the plurality of control valves in parallel, wherein the bypass passage fluidly connects the supply passage to the drain passage to bypass fluid around the plurality of control valves.

8. The machine control system of claim 7, wherein the supply passage is disposed within the valve stack on an opposing side of the plurality of control valves from the drain passage.

9. The machine control system of claim 8, wherein the warmup valve is located at an end of the valve stack.

10. A machine control system, comprising:

a pump driven to pressurize fluid;

a low pressure reservoir;

at least one actuator connected to receive fluid pressurized by the pump and discharge fluid to the low pressure reservoir;

a bypass passage situated to allow fluid pressurized by the pump to bypass the at least one actuator and flow to the low pressure reservoir;

a warmup valve disposed within the bypass passage and being movable between a flow-passing position and a flow-blocking position;

a hydraulic temperature sensor configured to generate a signal indicative of a temperature of the fluid; and a controller in communication with the pump, the warmup valve, and the hydraulic temperature sensor, the controller being configured to:

move the warmup valve to the flow-passing position, fix a displacement position of the pump, and adjust an input speed of the pump in response to the signal;

fix the displacement of the pump at a maximum displacement position when the signal indicates a temperature of the fluid less than a desired temperature;

set the input speed of the pump to a speed greater than a low-idle speed when the signal indicates the temperature of the fluid less than the desired temperature; and increment the input speed of the pump over a period of time when the signal indicates the temperature of the fluid less than the desired temperature.

11. The machine control system of claim 10, wherein the controller is configured to increment the input speed of the pump to a maximum input speed and maintain the maximum input speed of the pump for a period of time when the signal indicates the temperature of the fluid less than the desired temperature.

12. The machine control system of claim 11, wherein the controller is configured to return the input speed of the pump to the low-idle speed, reduce a displacement of the pump to a minimum displacement position, and move the warmup valve to the flow-blocking position when the temperature of the fluid increases to about the desired temperature or when operation of the pump has been maintained at the maximum input speed for a period of time.

13. The machine control system of claim 10, wherein the controller is configured to increment the input speed of the pump by about 100 rpm every sixty seconds.

14. A method of warming a machine control system, comprising:

displacing an amount of fluid at a displacement rate to pressurize the fluid;

directing pressurized fluid to an actuator;

sensing a temperature of the fluid;

in response to the sensed temperature, selectively directing pressurized fluid to bypass the actuator, fixing the displacement amount, and adjusting the displacement rate, the displacement amount being fixed, the pressurized fluid being directed to bypass the actuator, and the displacement rate being periodically incremented from a low-idle rate when the sensed temperature is less than about 30° C., incrementing the displacement rate to a maximum rate and maintaining the displacement rate at the maximum rate for a period of time when the sensed temperature is less than about 30° C.; and returning the displacement rate to a low-idle rate, reducing the displacement amount to a minimum amount, and blocking the pressurized fluid from bypassing the actuator when the temperature of the fluid increases above about 30° C. or the displacement rate has been maintained at the maximum rate for the period of time.

15. A method of warming a machine control system, comprising:

displacing an amount of fluid at a displacement rate to pressurize the fluid;

directing pressurized fluid to an actuator;

driving the displacing of fluid with an engine;

sensing a temperature of the engine, sensing a temperature of the fluid; and in response to the sensed fluid temperature, selectively directing pressurized fluid to bypass the actuator, fixing the displacement amount, and adjusting the displacement rate only after a temperature of the engine has increased to a desired engine temperature or the engine has driven the displacing of fluid for a period of time.

16. A machine, comprising:

an engine;

an engine temperature sensor configured to generate an engine temperature signal indicative of a temperature of the engine;

a pump driven by the engine to pressurize fluid;

a low pressure reservoir;

a work tool;

at least one actuator connected to receive fluid pressurized by the pump and discharge fluid to the low pressure reservoir to move the work tool;

a valve stack having:

a supply passage fluidly connected to the pump;

a drain passage fluidly connected to the drain passage;

at least one control valve fluidly connected between the supply and the drain passages and being configured to selectively regulate fluid flow to and from the at least one actuator;

a bypass passage fluidly connecting the supply and drain passages; and a warmup valve disposed within the bypass passage and being movable between a flow-passing position and a flow-blocking position;

a hydraulic temperature sensor configured to generate a hydraulic temperature signal indicative of a temperature of the fluid; and a controller in communication with the engine, the engine temperature sensor, the pump, the warmup valve, and the hydraulic temperature sensor, the controller being configured to move the warmup valve to the flow-passing position, fix a displacement position of the pump, and adjust periodically increment a speed of the engine in response to the hydraulic temperature signal only after the engine temperature signal indicates a temperature of the engine above a desired engine temperature or the engine has operated for a period of time.

* * * * *